March 3, 1964 C. B. BLAKE ETAL Re. 25,526

WIRE COILING MACHINE

Original Filed March 16, 1954 3 Sheets-Sheet 1

INVENTORS
Charles Benjamin Blake
Robert S. Cady
BY
H. T. Johnston
ATTORNEY

WIRE COILING MACHINE

Original Filed March 16, 1954 3 Sheets-Sheet 2

INVENTORS
Charles Benjamin Blake
Robert S. Cady
BY H. F. Johnston
ATTORNEY

WIRE COILING MACHINE

Original Filed March 16, 1954 3 Sheets-Sheet 3

INVENTORS
Charles Benjamin Blake
Robert S. Cady
BY
H. F. Johnston
ATTORNEY

United States Patent Office

Re. 25,526
Reissued Mar. 3, 1964

25,526
WIRE COILING MACHINE

Charles Benjamin Blake, North Woodbury, and Robert S. Cady, Watertown, Conn., assignors to Scovill Manufacturing Company, Waterbury, Conn., a corporation of Connecticut Original No. 2,900,073, dated Aug. 18, 1959, Ser. No. 416,528, Mar. 16, 1954. Application for reissue July 13, 1960, Ser. No. 42,732
6 Claims. (Cl. 205—16)

Matter enclosed in heavy brackets [ ] appears in the original patent but forms no part of this reissue specification; matter printed in italics indicates the additions made by reissue.

This invention relates to an improved process and apparatus for coiling wire.

A common practice in wire manufacture is to wind the wire on a spool as it comes from the wire-drawing machine. If any substantial quantity of wire is to be wound upon the spool, the spool itself become a relatively heavy and expensive item. . This adds to the shipping and handling cost and has the further objection that it is difficult to pay off properly to a fabricating machine which uses the wire, because of the inertia of the heavy spool.

It has also been proposed to package the wire in coil form so that it can pay off without having to move the entire coil. More recently, efforts have been made to coil the wire into cylindrical drums having a central hollow core. These drums are relatively cheap since they can be made principally from hard pressed paper board. Furthermore, very much greater continuous lengths of wire can be shipped and handled than in the case of loose coils. This, of course, is advantageous to the user of the wire, and furthermore there is less difficulty in paying off the wire from such a drum.

When any type of strand material is laid into coil form there is a tendency for a twist to accumulate backwardly into the uncoiled portion to the extent of one turn for each circle of the coil. This can be demonstrated when one attempts to coil the familiar garden hose upon the ground; unless the uncoiled portion is turned upon itself the coil has a tendency to snap into a figure 8 shape.

In the case of hot material, or very soft material, or very fine wire, this is not a serious problem because the twist is absorbed by the material itself during the coiling operation. However, in the case of most of the commercial wires this problem must be taken care of in some manner. It has been proposed to rotate the drum as the wire is laid into it from a stationary guide tube, and this practice is fairly satisfactory up to drawing speeds of 500 to 700 feet per minute. However, present day drawing speeds are more often 2,000 to 3,000 feet per minute. With the rotating drum method wire cannot be handled satisfactorily at such high speeds. The centrifugal force of the wire causes it to try to assume the largest diameter possible and press against the outer wall of the container. The wire does not lay evenly in a coil and it is impossible therefore to get any satisfactory quantity into the drum.

An object of this invention is to coil the wire into a stationary drum, or perhaps a relatively slow-moving drum, at any desired speed and at the same time eliminate the tendency for the wire to twist upon itself or to assume a figure 8.

According to our invention a rotary movement is imparted to the wire and it is then led through a guide tube or distributor which is rotated to lay the wire in a stationary coil. The speed of rotation of the distributor can be varied according to a predetermined pattern so as to vary the diameter of the coil which is laid in the drum so that the wire can be made to fill substantially the entire space in the drum between the core and the outer wall, or at any rate a great deal more wire can be placed in the drum than by any method where the coils can lay hit or miss in any fashion.

Our invention involves a rotary unit turning preferably on a vertical axis and [carrying] *in the illustrated embodiment, it carries* a drawing die which performs the final drawing operation. Since this drawing die is turning with the unit there is a permanent deformation of the wire around its own axis which may be termed a torsional deformation while it is being reduced in diameter so that the wire emerges from the die with a rotating movement about its own longitudinal axis, whereas it had no such movement when entering the die. Thus the rotary movement cannot back up on the wire. This arrangement requires that the capstan employed for pulling the wire through the last drawing operation be also mounted upon the rotating unit in the preferred embodiment of our invention.

In another embodiment the capstan can be stationary in substantially a horizontal plane, and the wire is directed around pulleys which themselves rotate bodily with the unit. In this way the wire is made to wrap around the stationary capstan, and is finally taken from the capstan by a guide tube travelling with the unit. While this second arrangement does not require a separate motor for driving the capstan, it does not permit varying the speed of rotation of the wire relative to the drawing speed. In the preferred embodiment a motor is mounted on the rotating unit to drive the capstan and because of the factor of weight it is preferable to use a high pressure hydraulic motor.

The accompanying drawings show a preferred embodiment and some modifications which the invention may assume in practice.

Figure 1:
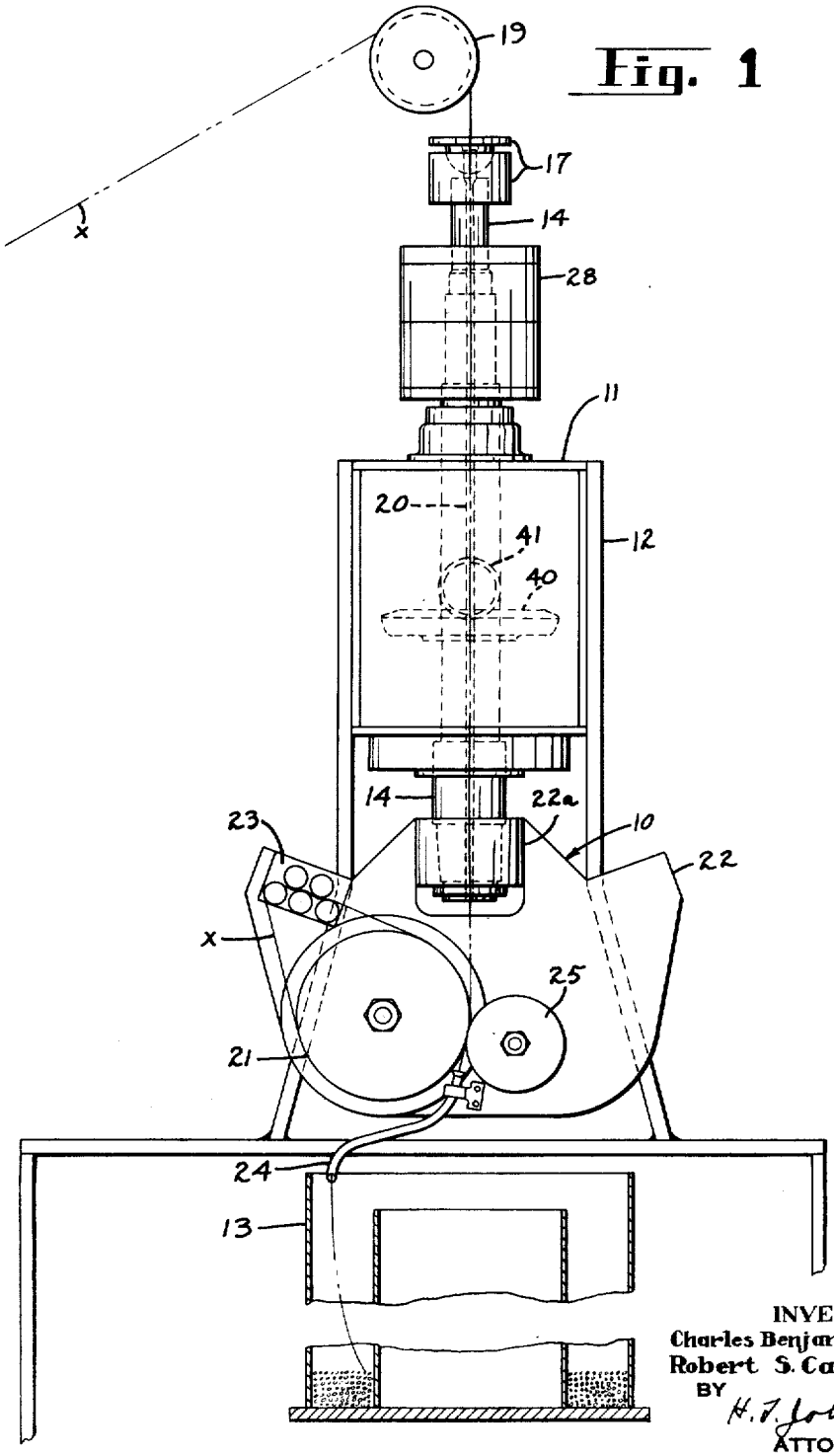
FIG. 1 is a front elevation of a wire-drawing and coiling machine embodying the preferred form of the invention.
Figure 2:
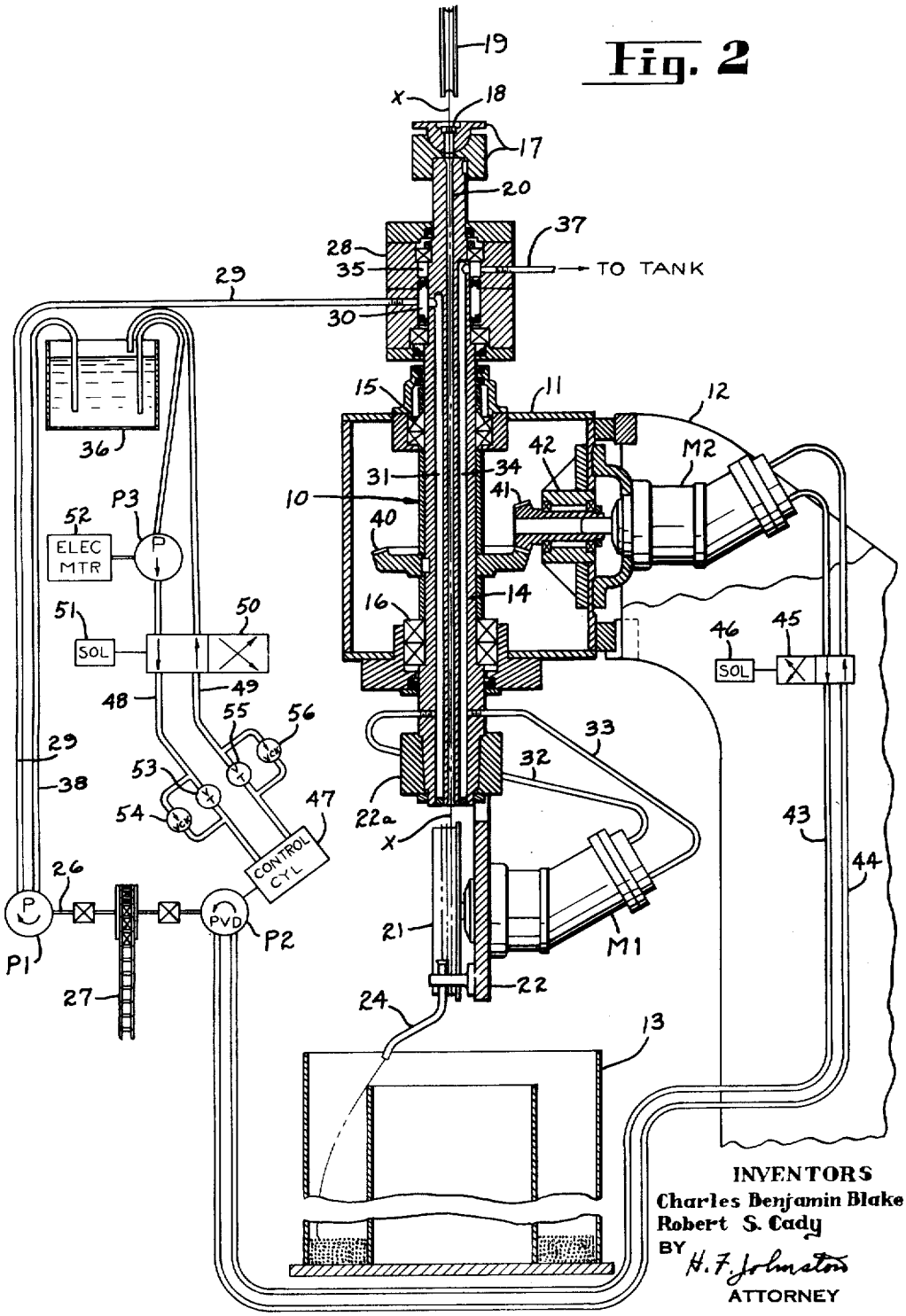
FIG. 2 is a vertical section through the machine and showing diagrammatically the hydraulic controls associated with the machine.

In the preferred embodiment of the invention, as shown in FIGS. 1 and 2, the rotary unit *which may also be described as a flyer assembly,* is generally indicated by the numeral 10 and is mounted in a housing 11 supported by a suitable support frame 12 so as to position the rotary unit and housing directly above a container 13 into which the wire X is to be coiled. The rotary unit 10 consists of an elongated vertical shaft 14 which turns in suitable bearings 15 and 16 carried by the housing 11. Mounted upon the upper end of the shaft 14 is a wire die holder 17 for receiving a die 18 which is the last drawing die in the manufacture of the wire to be coiled by this machine. This die, by reason of the fact that it is secured against a seat in the die holder, will turn with the rotary unit 10. The wire X is guided vertically into the die 18 by a guide pulley 19 suitably mounted thereabove to guide the wire from a wire drawing machine or from any machine that is paying off wire to be coiled. The die holder 17 is preferably of two parts so that the die can be angled to impart the desired cast to the wire.

The wire is drawn through the die 18 and passes downwardly into a central bore 20 in the shaft 14 by means of a power-driven vertically-arranged capstan 21 mounted on a support plate 22 attached to the lower end of the shaft 14 as by a collar 22a. The vertical capstan 21 is mounted to one side of the wire so that a vertical line through the die is tangent to the capstan, as said capstan revolves bodily with the unit 10 around the axis of the wire X. While revolving around the axis of the wire, the capstan must also be turned on its own axis to pull the wire through the die 18. Although any kind of motor might be used a hydraulic motor as indicated at M1 is believed preferable, both because it will deliver more power per unit of weight and can be readily synchronized with the speed of the machine from which the wire is delivered.

It is necessary to give the wire X several turns about the capstan 21 and, if desired, said wire may be taken from the capstan, directed through a set of wire casting rolls 23 carried by the plate 22 and back onto the capstan and thence through a guide tube or distributor 24 that directs the wire into the upper end of container 13 where it will fall by gravity in coil form to the bottom of said container. A rubber roller 25 is rotatably mounted on the plate 22 and bears against the capstan 21 to assure that the wire X coiled thereabout will be tightly maintained thereon. It is to be noted that the capstan 21, the rubber roller 25, the guide tube 24 and the wire casting rolls 23 all operate as a unit with the plate 22. The motor M1 also revolves around with the unit, and counterweights may be attached as needed so that the entire unit will be in dynamic balance.

When our machine takes wire directly from a wire-drawing machine, the speed of the motor M1 must have a definite relationship to the speed of such drawing machine. For this purpose a constant speed pump P1 is driven from a shaft 26 that in turn receives power through a chain drive 27 which may connect into the drive of the wire-drawing machine. The pump P1 is connected to an oil-seal housing 28 surrounding the shaft 14 above the housing 11 by a pipe 29. Fluid under pressure passes into an annular chamber 30 in oil-sealed housing 28 and thence into a long bore 31 in the rotating shaft 14, from where it is directed at the lower end of said shaft through a pipe 32 to the capstan motor M1. The fluid is exhausted from motor M1 through a pipe 33 that directs the fluid to the lower end of the shaft 14 and into another long bore 34 in said shaft which leads to an annular discharge chamber 35 in the oil-seal housing 28. The fluid flows from chamber 35 back to a supply tank 36 through pipe 37. The fluid is then recirculated from tank 36 to pump P1 through pipe 38.

In order to rotate the coiling unit 10, a bevel gear 40 is keyed to the shaft 14 within the support housing 11 and is driven by a smaller bevel gear 41 having suitable bearing support 42 in the back wall of the support housing 11. A fluid motor M2 is attached to the outside of the housing back wall and connects to the bevel gear 41 through the wall for driving the same. The motor M2 is fed by a variable volume pump P2 through pipe 43 and exhausted through pipe 44 directly to said pump P2 in a closed system.

The piping system and the controls for the pumps and motors are diagrammatically shown in FIG. 2. If it is desired to reverse the direction of rotation of the rotary unit 10 so that the wire will lie in the container 13 in the opposite coiled manner, it is only necessary to place a four-way valve 45 in both pipe lines 43 and 44 under the control of a solenoid 46.

In order to operate the rotary unit 10 at varying speed between predetermined limits so as to distribute the wire in uniform layers in container 13, a suitable control system is associated with pump P2. As shown in FIG. 2, this control system involves the use of a control cylinder 47 having pipes 48 and 49 leading to the supply tank 36. Connected in line with pipes 48 and 49 is a four-way valve 50 under the control of solenoid 51. A pump P3 is connected to the pipe 48 between the four-way valve 50 and the tank 36, and may be operated by an electric motor 52. Adjacent to control cylinder 47 in pipe line 48 is a throttle valve 53 and a check valve 54, and in pipe line 49 is a throttle valve 55 and a check valve 56. These valves operate in conjunction with the four-way valve 50 to control the rate of operation and reverse the direction of control cylinder 47.

Figure 3:
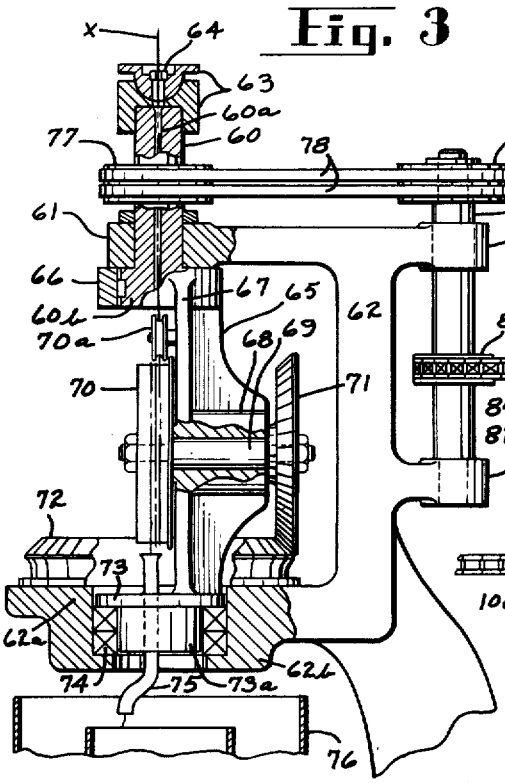
FIG. 3 shows a modified form of the invention in side elevation and partially in section wherein the capstan may be driven by a gear arrangement as the rotary unit is rotating.
Figure 4:
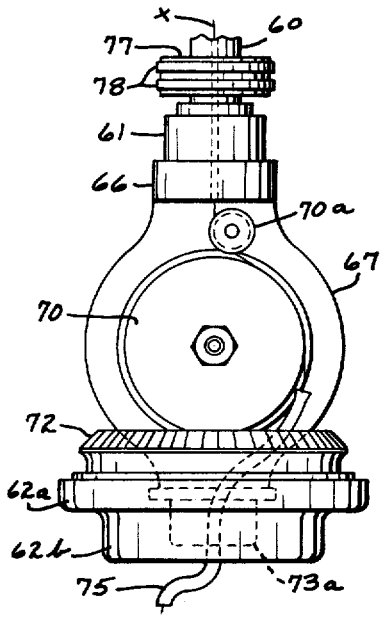
FIG. 4 is a schematic front elevation of the FIG. 3 form.

FIGS. 3 and 4 show a modified form of wire-drawing and coiling machine, wherein the vertical capstan may be operated through a gear arrangement as the rotary unit is rotating in a support frame. In this form a shaft 60 is supported in a bearing 61 on a support frame 62. On the upper end of shaft 60 is supported a conventional two-part die holder 63 and a drawing die 64 held securely within said holder 63. The shaft 60 has a central bore 60a through which the wire passes. The lower end of shaft 60 is enlarged at 60b and to which is rigidly secured a rotary unit 65 through a keyed collar connection 66. The rotary unit, similar to the first form, consists of a vertical support plate 67 having a horizontal bearing 68 supporting a capstan shaft 69 to one end of which is attached a capstan 70 vertically arranged in front of plate 67. A guide sheave 70a is rotatably mounted on the plate 67 so as to guide the wire from the shaft bore 60a to the capstan 70 (see FIG. 4). The usual form of rubber idler roller and caster rollers (not shown) may also be mounted on plate 67 and function with the capstan in the same manner as described in the first form of the invention.

The capstan 70, for drawing the wire through the die 64, is operated by a bevel-driven gear 71 attached to the opposite end of shaft 69 and which gear meshes with a larger stationary bevel gear 72 secured in a horizontal position to a support table 62a on frame 62. From this arrangement it will be obvious that as the rotary unit 65 rotates about the axis of the wire, the bevel gear 71 will rotate as it rolls about the stationary gear 72 to drive the capstan 70.

In order to rotatively support the lower end of the rotary unit 65, the lower end of the plate 67 is made integral with a disc plate 73 and depending bearing hub 73a having suitable support in embossed part 62b of support plate 62a through bearing 74. A wire guide or distributor tube 75 is carried by the bearing hub 73a for directing the wire from the capstan 70 and allows it to drop by gravity in coiled form upon a support or into a suitable container 76 positioned directly underneath the tube 75.

In order to operate the capstan at the proper rate of speed relative to the speed at which the wire is taken from a pay-off machine, a sheave 77 is keyed to the shaft 60 between the bearing 61 and die holder 63 and driven by belts 78 from a similar sheave 79 keyed to the upper end of a drive shaft 80 vertically supported on frame 62 in spaced bearings 81 and 82. Between the bearings 81 and 82 is keyed a sprocket 83 operated by a chain drive 84 that may be connetced into the drive of the machine from which the wire is received.

The above form of invention may be more economical to make as compared to the first form of invention but is not as flexible in operation inasmuch as the speed of the capstan relative to the speed of the rotation of the rotary unit is constant. However, if desired, the large beveled gear 72 can be mounted on a suitable bearing support and rotated so that the speed of the rotary unit 65 and distributor tube 75 may be varied independently of the speed of the capstan to obtain different size coils of wire and still maintain the proper speed of the capstan 70.

Figure 5:
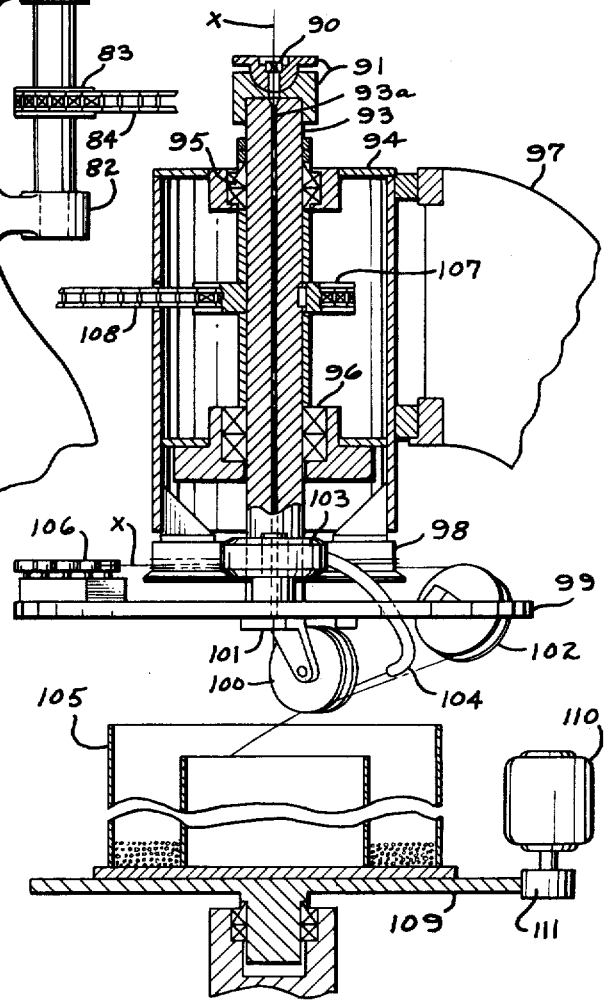
FIG. 5 show another modified form of invention wherein the capstan is stationary.

FIG. 5 shows another modified form of our invention that differs from the first two forms in that the capstan is held stationary while the rotary unit wraps the wire around the capstan several times for drawing the wire through the die, and the wire is removed from the capstan by a distributor carried by the rotary unit. In this form, the wire is drawn through a die 90 fixed in a two-piece castable die housing 91 attached to the upper end of a rotary vertical shaft 93 having a central bore 93a through which the wire passes. The shaft 93 is rotatably mounted in a housing 94 through bearings 95 and 96, and the housing in turn supported upon a suitable frame 97. A stationary capstan 98 is attached to the lower end and outside of the housing 94 in a horizontal position.

The lower end of the shaft 93 extends through and below the capstan 98 and has a large disc table 99 secured thereto transversely to the axis of said shaft. A guide sheave 100 is attached to the underside of the table 99 by brackets 101 and positioned in tangential alignment with the shaft bore 93a. Another guide sheave 102 is mounted in the plane of the table in a biased manner and positioned to direct the wire onto said capstan 98. The wire as it is pulled downwardly through the shaft bore 93a is first guided around sheave 100 and then upwardly about sheave 102 and onto the capstan 98. A rubber idler roll 103 is carried by the table 99 and bears against the periphery of the capstan 98 to assure that the wire wrapped about the capstan will be held firmly thereupon. A guide or distributor tube 104 is mounted on the table to rotate therewith and serves to pick up the wire wrapped about the capstan and direct it into a stationary container 105 positioned underneath the table 99.

In view of the fact that in this form the wire is guided about two sheaves before it reaches the capstan necessitates a straightening operation upon the wire. For that purpose, a set of wire straightener rolls 106 is mounted upon the table 99, and one course of wire may be taken from the capstan 98 and passed through said straightener rolls and back to said capstan so as to impart the proper cast to the wire as it is laid into the container.

In order to assure that the coiling machine will operate at the proper speed relative to the pay-off machine from which the wire is taken, the shaft 93 has a sprocket wheel 107 keyed to it at an intermediate section and having a chain drive connection 108 with the driving mechanism of the machine from which the wire is received.

Inasmuch as the wire drops by gravity as it leaves the distributor tube 104, it piles up unevenly in the container, which preferably is of the core type. The wire may be more evenly distributed in layers by slowly rotating the container 105. For that purpose, the container 105 may be mounted on a turntable 109 that may be slowly rotated by a suitable motor 110 having a friction roller 111 engaging the periphery of the turntable 109.

While we have herein described and upon the drawings shown illustrative embodiments of the invention, it is to be understood that the invention is not limited thereto but may comprehend other constructions and arrangements coming equally within the scope of the appended claims.

What we claim is:

1. Wire-drawing and coiling apparatus comprising a wire-drawing die, means for rotating said die to impart a rotating movement to the wire about its own longitudinal axis during the drawing operation, a capstan for pulling the wire through said die, the axis of said die and wire being substantially tangent to the surface of the capstan, means for bodily revolving said capstan about the axis of said wire and in the same direction as the rotating wire, means for applying power to the capstain to rotate the same on its own axis while revolving about the axis of said wire, and a distributor for receiving the wire from the capstan and directing it outwardly to a coil of the desired diameter, and means for rotating said distributor around the axis of said wire.

2. Wire-drawing and coiling apparatus comprising a power-driven unit mounted to rotate on a vertical axis, a wire-drawing die mounted in the upper part of said unit in axial alignment so as to rotate with said unit to impart a rotating movement to the wire about its own longitudinal axis during the drawing operation, a wire drawing capstan mounted on a horizontal axis and attached to said rotary unit below the die with one point in its periphery in substantially vertical alignment with the die whereby the capstan revolves with said unit around the axis of the wire, means for applying power to turn the capstan on its own axis to pull the wire through the die, and a distributor carried by said rotary unit for receiving wire from the capstan and directing it outwardly to lay the wire in a continuous coil.

3. Wire-drawing and coiling apparatus comprising a power-driven unit mounted to rotate on a vertical axis, a wire-drawing die mounted in the upper part of said unit in axial alignment so as to rotate with said unit to impart a rotating movement to the wire about its own longitudinal axis during the drawing operation, a wire-drawing capstan mounted on a horizontal axis to said rotary unit below the die, a motor mounted on said unit to turn the capstan and pull the wire through said die, and a guide tube carried by said rotary unit to receive the wire as it emerges from the capstan, said guide tube being directed outwardly to distribute the wire in a continuous coil.

4. Wire-drawing and coiling apparatus as defined in claim 3 wherein said rotary unit includes a central vertical shaft and wherein said capstan motor is a fluid pressure motor, said shaft having passageways for the pressure fluid and conduits leading from said passageways to said fluid pressure motor.

*5. A wire coiling machine including a frame and a flyer assembly mounted on said frame for receiving wire from a source of supply and laying the same in coils in a wire receiving means; said flyer assembly comprising a support member rotatably mounted on said frame, a coil forming capstan rotatably mounted on said support member for rotation therewith in an orbit around an axis of rotation of said support member, means for guiding wire to said capstan, means for casting said wire, means for rotating said capstan on its axis so that said wire is drawn through said guide means and casting means, and means for rotating said support member so that wire emanating from said capstan is laid in coils in said wire receiving means.*

*6. A wire coiling machine including a frame and a flyer assembly mounted on said frame for receiving wire from a source of supply and laying the same in coils in a wire receiving means; said flyer assembly comprising a support member rotatably mounted on said frame, a coil forming capstan rotatably mounted on said support member for rotation therewith in an orbit around an axis of rotation of said support member, means for guiding wire to said capstan, means for rotating said capstan on its axis so that said wire is drawn through said guide means and means for rotating said support member so that wire emanating from said capstan is laid in coils in said wire receiving means.*

References Cited in the file of this patent or the original patent

UNITED STATES PATENTS

| | | |
|---|---|---|
| 351,839 | Lenox | Nov. 2, 1886 |
| 366,383 | Daniels | July 12, 1887 |
| 439,114 | Clifford | Oct. 28, 1890 |
| 445,965 | Daniels | Feb. 3, 1891 |
| 553,935 | Purdy | Feb. 4, 1896 |
| 805,265 | Cowles et al. | Nov. 21, 1905 |
| 1,103,609 | Morgan | July 14, 1914 |
| 1,187,827 | Gibbs | June 20, 1916 |
| 1,653,461 | Honig | Dec. 20, 1927 |
| 1,739,620 | Summey | Dec. 17, 1929 |
| 2,216,225 | Bruestle | Oct. 1, 1940 |
| 2,379,801 | Henry | July 3, 1945 |
| 2,669,347 | McIlvried et al. | Feb. 16, 1954 |
| 2,849,195 | Richardson et al. | Aug. 26, 1958 |
| 2,929,575 | Kovaleski | Mar. 22, 1960 |